Figure 1:
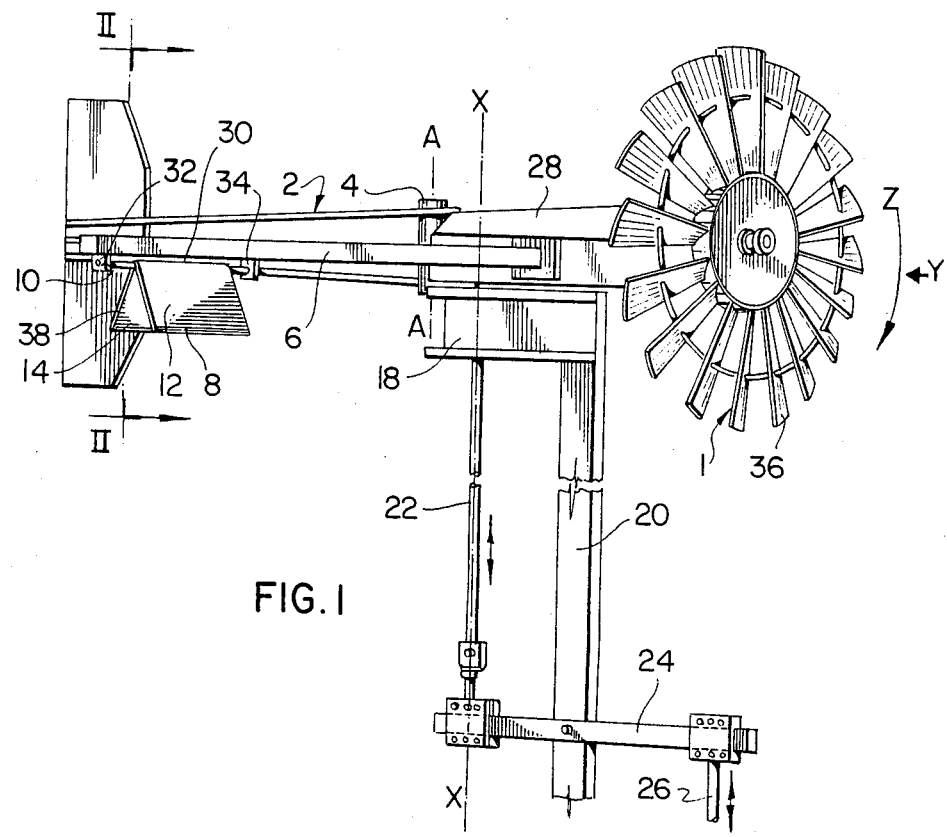

United States Patent [19]

Bond

[11] Patent Number: 4,787,819
[45] Date of Patent: Nov. 29, 1988

[54] WINDMILL DEVICE

[76] Inventor: Michael G. A. Bond, Box 563,, Mountain Township, Province of Ontario, Canada

[21] Appl. No.: 129,587

[22] Filed: Dec. 7, 1987

[51] Int. Cl.[4] .............................................. F03D 7/04
[52] U.S. Cl. ........................................ 416/15; 415/13
[58] Field of Search ............................. 416/15, 12–14, 416/170 A; 417/334–336

[56] References Cited

U.S. PATENT DOCUMENTS

| | | | |
|---|---|---|---|
| 183,622 | 10/1876 | Ball | 416/15 |
| 198,029 | 12/1877 | Lander | 416/15 |
| 237,467 | 2/1881 | Beckman et al. | 416/15 |
| 248,529 | 10/1881 | Tettershall | 416/15 |
| 253,651 | 2/1882 | Adams | 416/15 X |
| 272,566 | 2/1883 | Mack | 416/15 X |
| 384,756 | 6/1888 | Gorrell | 416/15 X |
| 538,594 | 4/1895 | O'Bryant | 416/15 |
| 1,887,802 | 11/1932 | Constantin et al. | 416/15 |
| 3,667,861 | 6/1972 | Parish | 416/14 |

FOREIGN PATENT DOCUMENTS 952250 11/1956 Fed. Rep. of Germany ........ 416/15

Primary Examiner—Everette A. Powell, Jr.
Attorney, Agent, or Firm—Francis W. Lemon

[57] ABSTRACT

A windmill device is provided having a windmill tail pivotally attached to a rear end of the fan or rotor assembly, to swing upwardly from alignment therewith, a laterally extending arm attached to the fan assembly to pivot therewith, and a depending flap vane hingedly attached at the top to a portion of the arm outside the wake thereof and urged to tilt forwardly in a downward direction towards the wind. The flap vane gradually swings the fan assembly away from pointing into the wind as the wind speed increases until a predetermined wind speed is reached when the fan assembly is held out of the wind with the arm extending parallel with the tail. A rear vane may be provided attached to the flap vane and forming an inverted V-shape therewith. An intermediate vane may also be provided extending downwardly between the flap vane and the rear vane.

9 Claims, 2 Drawing Sheets

WINDMILL DEVICE

This invention relates to a windmill device.

It has already been proposed in "Introduction to Wind Energy", E. H. Lysen, SWD, Amersfoort, The Netherlands, August 1980, pages 237 to 259, to provide a safety system for a windmill device comprising an inclined hinged tail vane and an auxiliary vane facing the wind to one side of the fan or rotor. The function of the safety system is to limit the rotational speed of the fan or rotor and to limit the axial force acting upon the fan or rotor. This is accomplished by the safety device gradually turning the fan or rotor out of the wind as the wind speed increases. The tail vane remains more or less parallel to the wind while the fan or rotor is turned out of the wind causing the tail vane to rise on the inclined hinge. The tail vane strives towards its lowest position, however, providing the moment that balances the moments of wind force of the fan or rotor and the auxiliary vane.

Lysen, page 258, lines 17 to 25, states that a model including this safety system was only correct at low wind speeds of up to about 5 m/second. For high wind speeds the model grossly deviated from reality, and much higher wind speeds were found necessary to turn the fan or rotor over a given angle S than the model predicted. One reason was thought to be that the auxiliary vane was mounted quite close to the fan or rotor causing it to be influenced by the wake of the fan or rotor, resulting in a reduction in speed and change in the wind speed.

There is a need for a safety system for a windmill device which above a predetermined wind speed will accurately swing the fan or rotor away from pointing into the wind to an extent depending on the wind velocity thus accurately governing the rotational speed of the fan or rotor and maintaining the speed below a predetermined maximum, above which damage may occur.

According to the present invention there is provided a windmill device, comprising:

(a) a fan assembly pivotally mounted to swivel about an upwardly extending axis for pointing into the wind, (b) a windmill tail pivotally attached to a rear end of the fan assembly about the said upwardly extending axis to swing upwardly to each side from alignment therewith, (c) a laterally extending arm attached to the fan assembly to pivot therewith about the said upwardly extending axis and extending well beyond the extremity thereof to be outside the wake thereof, (d) a depending flap vane hingedly attached at the top to a portion of the arm spaced beyond the extremity of the fan assembly and outside the wake thereof, the flap vane having a side face generally pointing in the same direction as the fan assembly for, in operation, progressively turning the fan assembly about the said upwardly extending axis out of the wind as the wind speed increases beyond a predetermined speed, and (e) means for holding the flap vane side face tilting downwardly towards the wind in the rest position.

In some embodiments of the present invention the means for holding the flap vane tilting downwardly towards the wind in the rest position comprises a depending rear vane behind the flap vane and attached thereto to tilt downwardly rearwardly away from the wind in the rest position.

In other embodiments of the present invention the means for holding the flap vane tilting downwardly towards the wind in the rest position further comprises weight means attached to the rear vane.

In yet other embodiments of the present invention the means for holding the flap vane tilting downwardly towards the wind in the rest position further comprises an outwardly bowed spring sheet urging the rear vane downwardly towards the wind.

In some embodiments of the present invention a fixed plate is provided on the arm immediately above the flap vane and is tilted upwardly towards the wind.

In other embodiments of the present invention the flap vane is provided in the rest position with a substantially horizontally extending, marginal, lower edge portion pointing into the wind.

In yet other embodiments of the present invention the flap vane and the rear vane delineate a substantially bell-shaped contour when viewed end wise.

In other embodiments of the present invention a depending, intermediate vane is provided between the flap vane and the rear vane which depends to about the same level as the flap vane and the rear vane in the rest position.

Preferably, the depending flap vane is on the side of the fan assembly indicated by the direction of rotation of the underside of the fan assembly.

Figure 2:
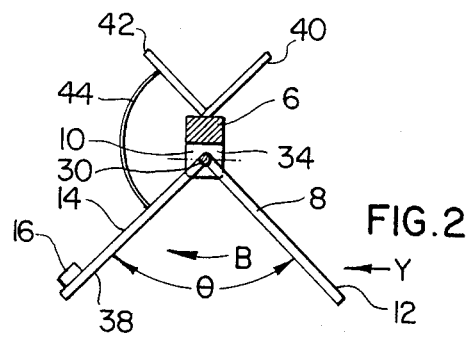
Figure 3:
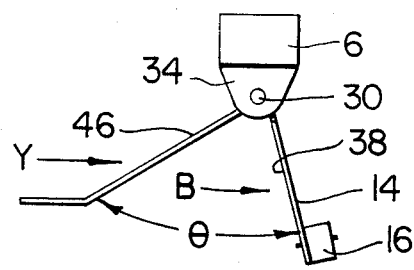
Figure 4:
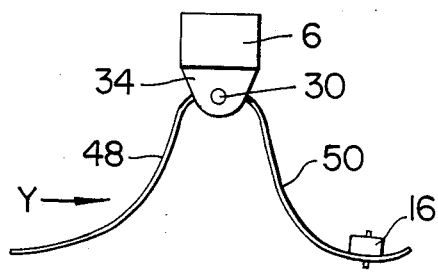
Figure 5:
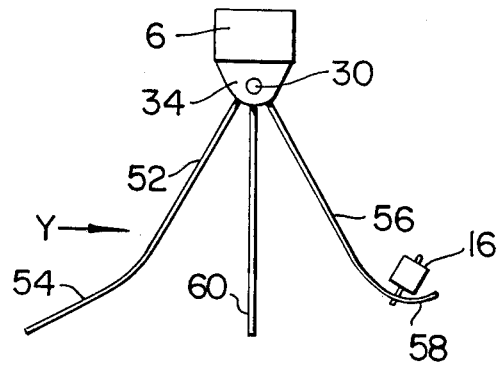

In the accompanying drawings which illustrate, by way of example, embodiments of the present invention, FIG. 1 is a perspective view of a windmill device, FIG. 2 is a sectional end view along II—II, FIG. 1, of the flap vane, and FIGS. 3 to 5 show different types of flap vane and rear vane assemblies.

In FIGS. 1 and 2, there is shown a windmill device, comprising (a) a fan assembly, generally designated 1, pivotally mounted to swivel about an upwardly extending axis XX for pointing into the wind, (b) a windmill tail, generally designated 2, pivotally attached by pivot 4 to a rear end of the fan assembly 1 to swing upwardly to each side from alignment therewith, (c) a laterally extending arm 6 attached to the fan assembly to pivot therewith and extending well beyond the extremity thereof to be outside the wake thereof, (d) a depending flap vane 8 hingedly attached at the top by a hinge 10 to a portion of the arm 6 beyond the extremity of the fan assembly 1 and outside the wake thereof, the flap vane 8 having a side face 12 generally pointing in the same direction as the fan assembly 1 for, in operation, progressively turning the fan assembly 1 out of the wind as the wind speed increases, and (e) means, in the form of a rear vane 14 behind the flap vane 8, and weights, one of which is shown and designated 16, for holding the flap vane 8 tilted towards the wind at low wind speeds.

The fan assembly 1 and the tail 2 are of the type described and claimed in co-pending application No. 07/129,586 filed on july 12, 1987.

The fan assembly 1 is pivotally supported on a support bracket 18 attached to a column 20 and reciprocates a connecting rod 22. The reciprocating movement of the connecting rod 22 rocks a beam 24 which in turn reciprocates a pump connecting rod 26.

The pivot 4 of the tail 2 is inclined to pivot the tail 2 about axis AA (FIG. 1) to swing the tail 2 upwardly to each side from alignment with the fan assembly 1.

The laterally extending arm 6 is attached to a casing 28 of the fan assembly 1.

The hinge 10 comprises a rod 30, to which the flap vane 78 and rear vane 14 are attached, and bearing brackets 32 and 34 attached to the arm 6 and pivotally supporting the rod 30.

In operation, with a wind in the direction Y (FIG. 1), the fan 36 is rotated in the direction Z (FIG. 1) causing the connecting rod 22 to be reciprocated.

The windmill tail 2 at low wind speeds keeps the fan 36 pointing into the wind. However, as the wind speed increases, the depending flap 8 is progressively rotated in the direction of arrow B, FIG. 2, by the wind exposing more of the surface area of side face 12 to the wind and gradually swivels the fan 36 away from pointing into the wind. This continues until a predetermined wind speed is reached at which the fan 36 is turned completely out of the wind and ceases to be rotated by it. In this condition, the arm 6 and depending flap 8 are more or less parallel with the tail 2 and at right angles to the axis of rotation of the fan 36.

It should be noted that as the fan 36 is being swivelled out of the wind and the depending flap 8 is also being turned, the side face 38 of the rear vane 14 also becomes exposed to the wind presenting extra surface area for the wind to act upon to turn the fan 36.

The weights, such as that designated 16, cause the depending flap 8 to gradually move the fan 36 out of the wind over a greater range of wind speeds, i.e. the heavier the weights such as 16 are, the greater will be the range of wind speeds.

It has been found that for normal prevailing winds an angle $\theta$ of about 90° is suitable. An angle $\theta$ of about 60° did not work too well but it was concluded that if the surface areas of surfaces 12 and 38 had been greater, then this angle would also be acceptable. For gusty wind conditions an angle $\theta$ of about 140° is most suitable.

Thus the depending flap vane 8:
(i) over a predetermined range of wind speeds, keeps fan 36 pointing into the wind,
(ii) swings the fan 36 out of the wind at a predetermined speed and avoids damage,
(iii) acts as a down wind airlon at a predetermined wind speed, and
(iv) determines the rotational speed range of the fan 36 for a particular wind speed range.

It should be noted that while the rear vane 14 is desirable, the depending flap vane 8 will also operate without it, providing that the depending flap vane 8 is tilted forwardly by, for example, counterweights or a spring.

In some embodiments of the present invention, the weight of the rear vane 14 alone is sufficient to hold the flap vane 8 tilted towards the wind.

It should also be noted that the arm 6 will limit the movement of the depending flap vane 8.

While the arm 6 may support the depending flap vane 8 on either side of the fan 36, it is preferable that the depending flap vane 8 be situated on the side of the fan 36 where it will counterbalance the torque effect of the fan 36, i.e. on the side indicated by the direction of movement of the underside of the fan 36.

If desired, fixed plates 40 and 42 (FIG. 2) may be provided forming a V immediately above the depending flap vane 8. The plate 40 is tilted upwardly towards the wind and will prevent the depending flap vane 8 from being rotated forwardly and will also assist in directing the wind on to the side face 12. An outwardly bowed sheet spring 44 may be sprung between the rear plate 42 and the rear vane 14, to urge the rear plate downwardly towards the wind and provide resistance for the depending flap vane 8 to the wind.

In some instances it may be desirable to roughen the surfaces 12 and 38 to increase the wind drag effect, thereby increasing the sensitivity of these surfaces to the wind velocity.

It will be appreciated that more than one flap vane 8, with or without the rear vane 14, may be mounted on the arm 6 either one above the other or side by side.

In FIGS. 3 to 5, similar parts to those shown in FIGS. 1 and 2 are designated by the same reference numerals and the previous description is relied upon to describe them.

In FIG. 3, there is shown a flap vane 46 provided in the rest position with a substantially horizontally extending, marginal, lower edge portion pointing into the wind. The angle $\theta$ may be about 70° and this embodiment of the present invention has been found to be very sensitive to changes in wind speed.

In FIG. 4 there is shown a flap vane 48 and a rear vane 50 delineating a substantially bell-shaped contour when viewed end wise. This embodiment of the present invention provides a positive control at various wind speeds.

In FIG. 5, there is shown a flap vane 52 provided with a lower marginal edge portion 54 inclined forwardly into the wind at a relatively smaller angle of inclination than the remainder. The rear vane 56 has a rearwardly curving lower marginal edge portion 58. A depending, intermediate vane 60 is between the flap vane 52 and the rear vane 56 which depends to about the same level as the flap vane 52 and the rear vane 56 in the rest position. This embodiment of the present invention functions well in strong gusts of wind and provides a longer control time over increments of wind speed. This embodiment also provides a very positive hold when the arm 6 is parallel with the tail 2 (FIG. 1) and the windmill device is held out of operation.

I claim:
1. A windmill device, comprising:
(a) a fan assembly pivotally mounted to swivel about an upwardly extending axis for pointing into the wind,
(b) a windmill tail pivotally attached to a rear end of the fan assembly to swing upwardly to each side from alignment therewith,
(c) a laterally extending arm attached to the fan assembly to pivot therewith and extending well beyond the extremity thereof to be outside the wake thereof,
(d) a depending flap vane hingedly attached at the top to a portion of the arm spaced beyond the extremity of the fan assembly and outside the wake thereof, the flap vane having a side face generally pointing in the same direction as the fan assembly for, in operation, progressively turning the fan assembly out of the wind as the wind speed increases, and
(e) means for holding the flap vane side face tilting downwardly towards the wind in the rest position.

2. A windmill device according to claim 1, wherein the means for holding the flap vane tilting downwardly towards the wind in the rest position comprises a depending rear vane behind the flap vane and attached thereto to tilt downwardly rearwardly away from the wind in the rest position.

3. A windmill device according to claim 2, wherein the means for holding the flap vane tilting downwardly towards the wind in the rest position further comprises weight means attached to the rear vane.

4. A windmill device according to claim 2, wherein the means for holding the flap vane tilting downwardly towards the wind in the rest position further comprises an outwardly bowed spring sheet urging the rear vane downwardly towards the wind.

5. A windmill device according to claim 1, wherein a fixed plate is provided on the arm immediately above the flap vane and is tilted upwardly towards the wind.

6. A windmill device according to claim 1, wherein the flap vane is provided in the rest position with a substantially horizontally extending, marginal, lower edge portion pointing into the wind.

7. A windmill device according to claim 2, wherein the flap vane and the rear vane delineate a substantially bellshaped contour when viewed end wise.

8. A windmill device according to claim 2, wherein a depending, intermediate vane is provided between the flap vane and the rear vane which depends to about the same level as the flap vane and the rear vane in the rest position.

9. A windmill device according to claim 1, wherein the depending flap vane is on the side of the fan assembly indicated by the direction of rotation of the underside of the fan assembly.

* * * * *